(12) United States Patent
Trotta (10) Patent No.: US 10,399,393 B1
(45) Date of Patent: Sep. 3, 2019

(54) RADAR SENSOR SYSTEM FOR TIRE MONITORING

(71) Applicant: Infineon Technologies AG, Neubiberg (DE)

(72) Inventor: Saverio Trotta, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/991,287

(22) Filed: May 29, 2018

(51) Int. Cl.
*H01Q 1/22* (2006.01)
*B60C 23/04* (2006.01)

(52) U.S. Cl.
CPC ...... *B60C 23/0452* (2013.01); *B60C 23/0454* (2013.01); *B60C 23/0461* (2013.01); *H01Q 1/2241* (2013.01)

(58) Field of Classification Search
CPC ............ B60C 23/0452; B60C 23/0454; B60C 23/0461; H01Q 1/2241
USPC ......................................................... 340/447
See application file for complete search history.

(56) References Cited

U.S. PATENT DOCUMENTS

| | | | |
|---|---|---|---|
| 4,241,347 A | 12/1980 | Albanese et al. | |
| 6,147,572 A | 11/2000 | Kaminski et al. | |
| 6,414,631 B1 | 7/2002 | Fujimoto | |
| 6,636,174 B2 | 10/2003 | Arikan et al. | |
| 7,048,973 B2 | 5/2006 | Sakamoto et al. | |
| 7,057,564 B2 | 6/2006 | Tsai et al. | |
| 7,171,052 B2 | 1/2007 | Park | |
| 7,317,417 B2 | 1/2008 | Arikan et al. | |
| 7,596,241 B2 | 9/2009 | Rittscher et al. | |
| 7,692,574 B2 | 4/2010 | Nakagawa | |
| 7,873,326 B2 | 1/2011 | Sadr | |
| 7,889,147 B2 | 2/2011 | Tam et al. | |
| 8,228,382 B2 | 7/2012 | Pattikonda | |
| 8,497,805 B2 | 7/2013 | Rofougaran et al. | |
| 8,659,369 B2 | 2/2014 | Rofougaran et al. | |
| 8,731,502 B2 | 5/2014 | Salle et al. | |
| 8,836,596 B2 | 9/2014 | Richards et al. | |
| 8,847,814 B2 | 9/2014 | Himmelstoss et al. | |
| 8,860,532 B2 | 10/2014 | Gong et al. | |

(Continued)

FOREIGN PATENT DOCUMENTS

| CN | 1463161 A | 12/2003 |
|---|---|---|
| CN | 203950036 U | 11/2004 |

(Continued)

OTHER PUBLICATIONS

Richards, Mark A., "Fundamentals of Radar Signal Processing," McGraw Hill Electronic Engineering, ISBN: 0-07-144474-2, Jun. 2005, 93 pages.

(Continued)

*Primary Examiner* — Kerri L McNally
(74) *Attorney, Agent, or Firm* — Slater Matsil, LLP (57) ABSTRACT

A system includes a millimeter-wave radar sensor circuit configured to be fastened to a wheel having a tire, and a controller. The millimeter-wave radar sensor circuit is configured to transmit a radio-frequency (RF) signal towards a portion of an inner surface of the tire and receive a reflected signal from the tire. The controller is configured to process the reflected signal, determine a property value of the tire based on processing the reflected signal, and generate and transmit a first signal representative of the property value of the tire.

25 Claims, 4 Drawing Sheets

(56) References Cited

U.S. PATENT DOCUMENTS

| | | | |
|---|---|---|---|
| 8,976,061 B2 | 3/2015 | Chowdhury | |
| 9,172,132 B2 | 10/2015 | Kam et al. | |
| 9,182,476 B2 | 11/2015 | Wintermantel | |
| 9,202,105 B1 | 12/2015 | Wang et al. | |
| 9,413,079 B2 | 8/2016 | Kamgaing et al. | |
| 9,495,600 B2 | 11/2016 | Heu et al. | |
| 2002/0189336 A1* | 12/2002 | McEwan | G01M 17/027 73/146 |
| 2003/0179127 A1 | 9/2003 | Wienand | |
| 2004/0238857 A1 | 12/2004 | Beroz et al. | |
| 2005/0268707 A1* | 12/2005 | Dale, Jr. | G01B 11/22 73/146 |
| 2006/0001572 A1 | 1/2006 | Gaucher et al. | |
| 2006/0049995 A1 | 3/2006 | Imaoka et al. | |
| 2006/0067456 A1 | 3/2006 | Ku et al. | |
| 2007/0210959 A1 | 9/2007 | Herd et al. | |
| 2008/0106460 A1 | 5/2008 | Kurtz et al. | |
| 2008/0238759 A1 | 10/2008 | Carocari et al. | |
| 2008/0291115 A1 | 11/2008 | Doan et al. | |
| 2008/0308917 A1 | 12/2008 | Pressel et al. | |
| 2009/0073026 A1 | 3/2009 | Nakagawa | |
| 2009/0085815 A1 | 4/2009 | Jakab et al. | |
| 2009/0102636 A1* | 4/2009 | Tranchina | B60C 23/0408 340/447 |
| 2009/0153428 A1 | 6/2009 | Rofougaran et al. | |
| 2009/0315761 A1 | 12/2009 | Walter et al. | |
| 2010/0207805 A1 | 8/2010 | Haworth | |
| 2011/0299433 A1 | 12/2011 | Darabi et al. | |
| 2012/0087230 A1 | 4/2012 | Guo et al. | |
| 2012/0092284 A1 | 4/2012 | Rofougaran et al. | |
| 2012/0116231 A1 | 5/2012 | Liao et al. | |
| 2012/0195161 A1 | 8/2012 | Little et al. | |
| 2012/0206339 A1 | 8/2012 | Dahl | |
| 2012/0280900 A1 | 11/2012 | Wang et al. | |
| 2013/0027240 A1 | 1/2013 | Chowdhury | |
| 2013/0106673 A1 | 5/2013 | McCormack et al. | |
| 2014/0028542 A1 | 1/2014 | Lovitt et al. | |
| 2014/0070994 A1 | 3/2014 | Schmalenberg et al. | |
| 2014/0145883 A1 | 5/2014 | Baks et al. | |
| 2014/0324888 A1 | 10/2014 | Xie et al. | |
| 2015/0181840 A1 | 7/2015 | Tupin, Jr. et al. | |
| 2015/0185316 A1 | 7/2015 | Rao et al. | |
| 2015/0212198 A1 | 7/2015 | Nishio et al. | |
| 2015/0243575 A1 | 8/2015 | Strothmann et al. | |
| 2015/0277569 A1 | 10/2015 | Sprenger et al. | |
| 2015/0325925 A1 | 11/2015 | Kamgaing et al. | |
| 2015/0346820 A1 | 12/2015 | Poupyrev et al. | |
| 2015/0348821 A1 | 12/2015 | Iwanaga et al. | |
| 2015/0364816 A1 | 12/2015 | Murugan et al. | |
| 2016/0018511 A1 | 1/2016 | Nayyar et al. | |
| 2016/0041617 A1 | 2/2016 | Poupyrev | |
| 2016/0041618 A1 | 2/2016 | Poupyrev | |
| 2016/0061942 A1 | 3/2016 | Rao et al. | |
| 2016/0061947 A1 | 3/2016 | Patole et al. | |
| 2016/0098089 A1 | 4/2016 | Poupyrev | |
| 2016/0103213 A1 | 4/2016 | Ikram et al. | |
| 2016/0109566 A1 | 4/2016 | Liu et al. | |
| 2016/0118353 A1 | 4/2016 | Ahrens et al. | |
| 2016/0146931 A1 | 5/2016 | Rao et al. | |
| 2016/0146933 A1 | 5/2016 | Rao et al. | |
| 2016/0187462 A1 | 6/2016 | Altus et al. | |
| 2016/0191232 A1 | 6/2016 | Subburaj et al. | |
| 2016/0240907 A1 | 8/2016 | Haroun | |
| 2016/0249133 A1 | 8/2016 | Sorensen | |
| 2016/0252607 A1 | 9/2016 | Saboo et al. | |
| 2016/0259037 A1 | 9/2016 | Molchanov et al. | |
| 2016/0266233 A1 | 9/2016 | Mansour | |
| 2016/0269815 A1 | 9/2016 | Liao et al. | |
| 2016/0291130 A1 | 10/2016 | Ginsburg et al. | |
| 2016/0299215 A1 | 10/2016 | Dandu et al. | |
| 2016/0306034 A1 | 10/2016 | Trotta et al. | |
| 2016/0320852 A1 | 11/2016 | Poupyrev | |
| 2016/0320853 A1 | 11/2016 | Lien et al. | |
| 2016/0327633 A1 | 11/2016 | Kumar et al. | |
| 2016/0334502 A1 | 11/2016 | Ali et al. | |
| 2016/0349845 A1 | 12/2016 | Poupyrev et al. | |
| 2017/0033062 A1 | 2/2017 | Liu et al. | |
| 2017/0045607 A1 | 2/2017 | Bharadwaj et al. | |
| 2017/0052618 A1 | 2/2017 | Lee et al. | |
| 2017/0054449 A1 | 2/2017 | Mani et al. | |
| 2017/0060254 A1 | 3/2017 | Molchanov et al. | |
| 2017/0070952 A1 | 3/2017 | Balakrishnan et al. | |
| 2017/0074974 A1 | 3/2017 | Rao et al. | |
| 2017/0074980 A1 | 3/2017 | Adib et al. | |
| 2017/0090014 A1 | 3/2017 | Subburaj et al. | |
| 2017/0090015 A1 | 3/2017 | Breen et al. | |
| 2017/0097223 A1* | 4/2017 | Darrer | B60C 23/0486 |
| 2017/0115377 A1 | 4/2017 | Giannini et al. | |
| 2017/0131395 A1 | 5/2017 | Reynolds et al. | |
| 2017/0139036 A1 | 5/2017 | Nayyar et al. | |
| 2017/0170947 A1 | 6/2017 | Yang | |
| 2017/0176574 A1 | 6/2017 | Eswaran et al. | |
| 2017/0192847 A1 | 7/2017 | Rao et al. | |
| 2017/0201019 A1 | 7/2017 | Trotta | |
| 2017/0212597 A1 | 7/2017 | Mishra | |
| 2017/0361662 A1* | 12/2017 | Wei | B60C 11/243 |
| 2017/0364160 A1 | 12/2017 | Malysa et al. | |
| 2018/0046255 A1 | 2/2018 | Rothera et al. | |
| 2018/0101239 A1 | 4/2018 | Yin et al. | |
| 2018/0272813 A1* | 9/2018 | Singh | B60C 11/243 |
| 2018/0286246 A1* | 10/2018 | Baca | G08G 1/165 |

FOREIGN PATENT DOCUMENTS

| | | |
|---|---|---|
| CN | 1716695 A | 1/2006 |
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| DE | 102008054570 A1 | 6/2010 |
| DE | 102011075725 A1 | 11/2012 |
| DE | 102014118063 A1 | 7/2015 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |
| WO | 2007060069 A1 | 5/2007 |
| WO | 2013009473 A2 | 1/2013 |
| WO | 2016033361 A1 | 3/2016 |

OTHER PUBLICATIONS

Chen, Xiaolong et a., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

Chuanhua, Du "Chinese Doctoral Dissertations & Master's Theses Full Text Database (Masters)—Information Science and Technology Series," China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Diederichs, Kailtyn et al., "Wireless Biometric Individual Identification Utilizing Millimeter Waves", IEEE Sensors Council, 3500104, vol. 1, No. 1, Feb. 2017, 4 pages.

Dooring Alert Systems, "Dooring Alert Systems Riders Matter" http:\\dooringalertsystems.com, printed Oct. 4, 2017, 16 pages.

Filippelli, Mario et al., "Respiratory dynamics during laughter," J Appl Physiol, (90), 1441-1446, Apr. 2001, http://jap.physiology.org/content/jap/90/4/1441.full.pdf.

(56) References Cited

OTHER PUBLICATIONS

Fox, Ben "The Simple Technique That Could Save Cyclists' Lives," https://www.outsideonline.com/2115116/simple-technique-could-save-cyclists-lives, Sep. 19, 2016, 6 pages.

Gu, Changzhan et al., "Assessment of Human Respiration Patterns via Noncontact Sensing Using Doppler Multi Radar System", Sensors Mar. 2015, 15(3), 6383-6398, doi: 10.3390/s150306383, 17 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 18 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Lim, Soo-Chul et al., "Expansion of Smartwatch Touch Interface from Touchscreen to Around Device Interface Using Infrared Line Image Sensors," Sensors, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Schemmel, P. et al., applied optics, "Monitoring stress changes in carbon fiber reinforced polymer composites with GHz radiation", vol. 56, No. 22 / Aug. 1, 2017, 5 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Simon, W., et al., "Highly Integrated KA-Band Tx Frontend Module Including 8×8 Antenna Array," IMST GmbH, Germany, Asia Pacific Microwave Conference, Dec. 7-10, 2009, 63 pages.

Sivers IMA AB, "FMCW Radar Sensors", Jun. 2011, 44 pages.

Suleymanov, Suleyman "Design and Implementation of an FMCW Radar Signal Processing Module for Automotive Applications," Master Thesis, University of Twente, Aug. 31, 2016, 61 pages.

Thayananthan, T. et al., "Intelligent target recognition using micro-doppler radar signatures," Defence R&D Canada, Radar Sensor Technology III, Proc. of SPIE, vol. 7308, 730817, Dec. 9, 2009, 11 pages.

Thayaparan, T. et al. "Micro-Doppler Radar Signatures for Intelligent Target Recognition," Defence Research and Development Canada, Technical Memorandum, DRDC Ottawa TM 2004-170, Sep. 2004, 73 pages.

Wikipedia, "Tire-pressure monitoring system", May 7, 2018, 8 pages.

Infineon, SP37T, "High integrated single-chip TPMS sensor with a low power embedded microcontroller and wireless FSK/ASK UHF transmitter", TPMS Tire Pressure Monitoring Sensor, Apr. 3, 2012, 170 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, 11 pages.

Infineon, "Using BGT24MTR11 in Low Power Applications", BGT24MTR11, 24 Ghz Radar, RF and Protection Devices, Application Note AN341, Revision: Rev. 1.0, Dec. 2, 2013, 25 pages.

Texas Instruments, "XWR1xxx Power Management Optimizations—Low Cost LC Filter Solution", Application Report SWRA577—Oct. 2017, 19 pages.

Texas Instruments, "Programming Chirp Parameters in TI Radar Devices", Application Report SWRA553—May 2017, 15 pages.

* cited by examiner

PRIOR ART

RADAR SENSOR SYSTEM FOR TIRE MONITORING

TECHNICAL FIELD

The present invention relates generally to an electronic system, and, in particular embodiments, to a radar sensor system for tire monitoring.

BACKGROUND

The health of the tires of a vehicle generally has a direct impact on the safety and efficiency of such vehicle. For example, it is known that driving with under-inflated tires may result in poor fuel economy, increased tire wear, and hazardous condition.

There are known devices that monitor some of the tire properties that affect the health of the tire. For example, a tire-pressure monitoring system (TPMS) is an electronic device that monitors the air pressure of the tire. Typically, the driver of the vehicle is alerted when the air pressure of one of the tires is low.

Some TPMS, known as indirect TPMS, operate by detecting differences between the rotational speeds between the wheels of the vehicle. The theory of operation is based on the assumption that under-inflated tires have a lower diameter, and therefore, rotate faster than a fully inflated tire. Other TMPS, known as direct TPMS, measure the air pressure directly on each tire.

Figure 1:
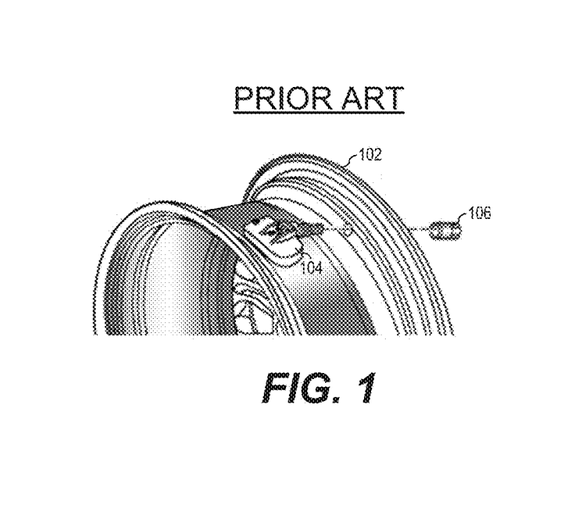
FIG. 1 shows a conventional TPMS attached to a rim.

Some direct TPMS are inside the tire and use a micro-electromechanical system (MEM) to measure the pressure inside the tire. For example, FIG. 1 shows TMPS 104 mounted on rim 102. A tire (not shown) is disposed around rim 102. TPMS 104 is attached to rim 102 by being screwed with nut 106. Such direct TPMS transmit the sensed information wirelessly to a receiver in the vehicle.

SUMMARY

In accordance with an embodiment, a system includes a millimeter-wave radar sensor circuit configured to be fastened to a wheel having a tire, and a controller. The millimeter-wave radar sensor circuit is configured to transmit a radio-frequency (RF) signal towards a portion of an inner surface of the tire and receive a reflected signal from the tire. The controller is configured to process the reflected signal, determine a property value of the tire based on processing the reflected signal, and generate and transmit a first signal representative of the property value of the tire.

In accordance with another embodiment, a method for tire monitoring includes: transmitting an RF signal from an inside of a wheel and towards an inner surface of a tire disposed on a rim of the wheel using a millimeter-wave radar sensor circuit; receiving a reflected signal from the tire; processing the reflected signal; determining a property value of the tire based on processing the reflected signal; and generating a signal representative of the property value of the tire.

In accordance with yet another embodiment, a millimeter-wave radar is configured to be fastened to a wheel having a tire. The millimeter-wave radar includes: a millimeter-wave radar sensor circuit that includes a front-end RF circuit configured to be coupled to a first antenna, a controller, and a wireless interface. The millimeter-wave radar sensor circuit is configured to transmit via the first antenna an RF signal towards an inner surface of the tire and receive a reflected signal from the tire. The controller is coupled to the millimeter-wave radar sensor circuit. The wireless interface is coupled to the controller and is configured to be coupled to a second antenna. The wireless interface is configured to transmit data associated with the reflect signal via the second antenna to a processor, where the controller or the processor is configured to: process the reflected signal, determine a property value of the tire based on processing the reflected signal, and generate and transmit a first signal representative of the property value of the tire.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

The present invention is described with respect to embodiments in a specific context, a system having a millimeter-wave radar sensor circuit for sensing various properties of a tire of a vehicle. Embodiments of the present invention may be used for sensing other properties of the tire. Embodiments may also be used for sensing properties of other types of rotating wheels. Some embodiments may be integrated with a TPMS, such as conventional TPMS.

Some of the tire's properties may change over time. For example, in addition to the tire's air pressure, properties such as the thickness of the tire and the depth of the tire's tread may change over time and may affect the tire's health. Monitoring the property values (e.g., air pressure, tire thickness, and the depth of the tread of the tire) and monitoring the property changes over time is, therefore, advantageous. For example, by determining property values and property changes of one tire with respect to a reference value, it is possible to determine whether an alignment of the vehicle is due. It is also possible to determine whether the tires are fully used (e.g., no tread left), or whether the tire suddenly began to malfunction (e.g., as a result of a nail as opposed to lower ambient temperature).

The values of particular properties of the tire, as well as changes in those properties, may result in specific signatures detectable by illuminating the tire with a radio-frequency (RF) signal and analyzing the reflected echo signal. Such signatures are also affected by the specific construction and shape of the tire. The signatures of the tire operating under normal conditions may be recorded and stored, for example, during a first usage of the tire. Deviations between the signatures of the reflected signal during operation and the recorded signatures may indicate property changes. The magnitude of such deviations may be indicative of the value of a particular tire property. For example, the average in reflected power of GHz illumination from the surface of the tire, or a phase between the transmitted signal and the reflected signal may be indicative of a property value. Similarly, the change/difference between the average reflected power or phase and the initial measurements may be indicative of a property value or a property change.

In an embodiment of the present invention, a millimeter-wave radar fastened to a wheel that includes a rim and a tire around the rim is used to detect property values and property changes of the tire by transmitting RF signals towards an inner surface of the tire and analyzing/processing the reflected (echo) signals. In some embodiments, the property values and property changes are detected by comparing measurements of the phase of the echo signal with an initial phase measurements and/or by comparing measurements of the average power of the echo signal with an initial average reflected power. In some embodiments, the properties of the tire that are monitored with the millimeter-wave radar include air pressure, tire thickness, tread depth, and rotational speed of the tire.

Figure 2:
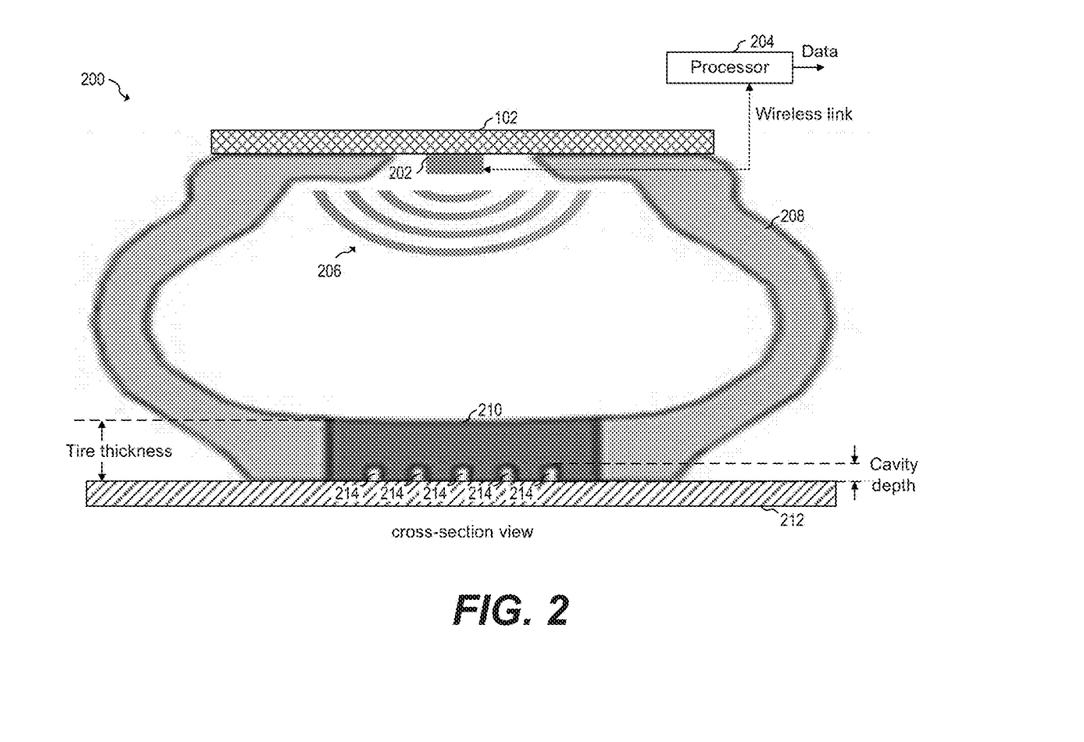
FIG. 2 shows a cross-section view of a millimeter-wave radar system, according to an embodiment of the present invention.

Embodiments of the present invention detect property values and property changes of a tire by using a millimeter-wave radar together with signal processing techniques. For example, FIG. 2 shows a cross-section view of millimeter-wave radar system 200, according to an embodiment of the present invention. Millimeter-wave radar system 200 includes millimeter-wave radar 202 and processor 204.

FIG. 2 shows, in particular, the cross-section view of tire 208 around rim 102. The tire 208 may be secured to the rim in any known manner. As shown, millimeter-wave radar 202 is fastened to rim 102 and is configured to transmit RF signals towards inner surface 210 of tire 208. In some embodiments, millimeter-wave radar 202 is firmly attached to rim 102 and, therefore, rotates together with rim 102. In such embodiments, the portion of tire 208 that is illuminated is always the same. Such portion may be illuminated when it is in contact with road 212, or when it is not in contact with road 212 (e.g., as tire 208 and rim 102 rotates, the illuminated portion rotates along and is in contact with road 212 once per revolution).

In other embodiments, millimeter-wave radar 202 is fastened to rim 102 in such a way as to always point towards the same direction (e.g., down towards road 212). Such implementation may be accomplished, for example, by attaching millimeter-wave radar 202 to a bearing disposed around rim 102, inside rim 102, or inside a hub of the wheel. For instance, in such configurations, the millimeter-wave radar 202 is configured to avoid rotating with rim 102.

During normal operation, millimeter-wave radar 202 transmits one or more radiation pulses 206, such as chirps, towards inner surface 210 of tire 208. The transmitted radiation pulses 206 are reflected by objects in the field of view of millimeter-wave radar 202, such as inner surface 210, other surfaces of tire 208, such as surfaces of treads 214 (i.e., of the cavities of the treads of tire 208) or the outer surface of the tire, road 212, and other objects in the field of view of millimeter-wave radar 202. The reflected radiation pulses (not shown in FIG. 2), which are also referred to as the reflected signals or the echo signals, are detected by millimeter-wave radar 202, digitized, thereby generating echo data, and processed by processor 204 to, for example, identify property values and property changes in tire 208.

Processor 204 receives data from millimeter-wave radar 202 and analyses the echo data to determine property values of the tire and/or whether a change in properties of the tire has occurred. The exchange of data is advantageously carried out wirelessly, although configurations relying of a wire-based connection may be used. For example, processor 204 determines one or more property values, for instance chosen among the depth of tread 214, the thickness of tire 208 and the air pressure of tire 208, by comparing the reflected signal with a reference signal. In some embodiments, the reference signal corresponds to a signature that is determined by characterizing a particular model of tire 208 in various test situations.

Processor 204 may also determine whether a property of tire 208 has changed with respect to a previous time by comparing the reflected signal with a previously reflected signal, or by comparing the obtained property value(s) with previous property value(s). The previously reflected signal or property values(s) may correspond to a signal that was reflected seconds, minutes, hours, days, months, or years before the current reflected signal. In some embodiments, the previously reflected signal may correspond to a reflected signal received during assembly of the particular vehicle, or when the tires are first installed in the vehicle.

Examples of property changes include, but are not limited to, a reduction of the depth of tread 214, which may correspond to tread wear, change in the distance between millimeter-wave radar 202 and road 212, which may correspond to a change in air pressure of tire 208 (optionally when considered together with the thickness of tire 208), change in the thickness of tire 208, which may correspond to tire 208 wear.

In some embodiments, processor 204 compares the reflected signal with a reference signal or a previously reflected signal and detects a difference between them. The particular property values or property changes may be based on such a difference. Here, "difference" may be understood as a discrepancy or deviation between the reflected signal and the expected signal (e.g., the reference signal) or the previously reflected signal. In effect, the difference may take the form of one or more quantitative parameter indicative of a gap between the two signals. For example, in some embodiments, a parameter indicative of a phase difference between the signals may be used. In other embodiments, a parameter indicative of a difference in the respective average powers of the signals may be used. Using a parameter constructed as a function of other such parameters such as a weighted combination thereof, and the like, may also be used.

For example, processor 204 may analyze the phase of the echo signal and compare the phase to a phase reference to determine the value of a property of tire 208 or whether the property has changed. For example, at a first time (e.g., during manufacturing, assembly, or tire installation), a first phase measurement is performed and stored. Such first measurement may be associated with a particular property, such as thickness of tire 208, depth of tread 214, or air pressure of tire 208. Subsequent phase measurements may exhibit phase differences with respect to the first phase measurements. Processor 204 may determine the value of the particular property (e.g., as thickness of tire 208, depth of tread 214, or air pressure of tire 208) based on the phase difference. Other quantitative measurements, such as average reflected power, characteristics of frequency domain signature, Doppler signature, or a combination thereof may also be used.

To determine one or more properties of tire 208, a machine learning algorithm may be used. For example, in some embodiments a machine learning algorithm, such as a random forest algorithm, may be used to determine signatures of the reflected signal that correspond to different types of properties, property values, and property changes. In particular, the machine learning algorithm may create, during a training phase, signatures based on correlations between phases, phase changes, average power, average power changes, Doppler effects, etc. Each signature may be associated with a different property or property value. A classifier may be used to distinguish between each property, property value and property change. Processor 204 may take an action in response to the output of the classifier.

Millimeter-wave radar system 200 includes one millimeter-wave radar 202 on a wheel. Some embodiments may include more than one (e.g., two, three, four, or more) millimeter-wave radars 202 disposed or fastened inside the wheel. Having more than one millimeter-wave radar 202 on the wheel has the advantage of allowing illumination of different portions of tire 208 at the same instant, which may provide additional information to processor 204 to accurately determine the health of tire 208. For example, simultaneously capturing properties of the portion of tire 208 in contact with road 212 and a portion of tire 208 not in contact with road 212 provides additional information that may be associated with other phenomena, such as tire balancing, or the weight distribution of the vehicle. In some embodiments, the portions illuminated by each millimeter-wave radar 202 partially overlap.

In some embodiments, energy harvesting (e.g., from electromechanical radiation, car vibration, dissipation of kinetic energy upon braking of the vehicle, etc.) may be used to recharge a local battery (not shown) that is connected to life millimeter-wave radar 202 to extend the operating life of millimeter-wave radar 202. In such embodiments, it is possible for millimeter-wave radar 202 to continuously monitor the health of tire 208. In some embodiments, millimeter-wave radar 202 may monitor the health of tire 208 in one or more instants and turn off for the rest of the time (e.g., with a low duty cycle) to preserve battery and extend the life of millimeter-wave radar 202.

Processor 204 may be implemented as a general purpose processor, controller or digital signal processor (DSP), such as a low power general purpose microcontroller. In some embodiments, processor 204 may be implemented as a custom application specific integrated circuit (ASIC). In some embodiments, processor 204 includes a plurality of processors, each having one or more processing cores. In other embodiments, processor 204 includes a single processor having one or more processing cores. In some embodiments, processor 204, or a portion of processor 204 may be embedded in millimeter-wave radar 202.

Millimeter-wave radar 202 includes a millimeter-wave radar sensor circuit and an antenna(s). In some embodiments, the millimeter-wave radar sensor circuit and antenna(s) are implemented in bistatic configuration (i.e., a transmitter and a receiver separated by a distance). In other embodiments, the millimeter-wave radar sensor circuit and antenna(s) are implemented in monostatic configuration (i.e., a transmitter and a receiver are collocated). Some embodiments may have one or more antennas dedicated for the transmitter (TX) module and one or more antennas dedicated for the receiver (RX) module of the millimeter-wave radar. Other embodiments may share the same antenna for the RX and TX modules of the millimeter-wave radar, such as in monostatic implementations.

The millimeter-wave radar sensor circuit may transmit and receive signals in the GHz range. For example, some embodiments may transmit and receive signals such as chirps in a band allocated around frequencies such as 95 GHz, 120 GHz, 140 GHz, and/or 240 GHz and/or other frequencies between about 95 GHz and about 240 GHz range. Other embodiments may transmit and receive signals such as chirps in the 20 GHz to 122 GHz range. Yet other embodiments may transmit and receive signals, such as chirps with frequencies above 240 GHz. Other frequencies and frequency ranges are also possible. By running at high frequencies, the package and antenna size of millimeter-wave radar 202 may be reduced.

In some embodiments, the millimeter-wave radar sensor circuit process the echo signals received by using band-pass filter (BPFs), low-pass filter (LPFs), mixers, low-noise amplifier (LNAs), and intermediate frequency (IF) amplifiers in ways known in the art. The echo signals are then digitized using one or more analog-to-digital converters (ADCs) for further processing. Other implementations are also possible.

Advantages of some embodiments include real-time monitoring of a plurality of tire properties, such as the depth of the tire treads, tire wear, air pressure, tire failure (e.g., tire perforated by a nail), tire rotational speed, and others. Such information may be used by other real time systems to improve accuracy. For example, the estimated fuel range may be adjusted based on the air pressure and current diameter of the tire to improve accuracy.

Placing the millimeter-wave radar inside the tire has additional advantages, such as ease of integration, as the inside of the tire is generally less packed than the inside of a vehicle. In some embodiments, by placing the millimeter-wave radar inside the tire, computations to accommodate or compensate for some tire movement (e.g., turn left or right) with respect to the millimeter-wave radar may be avoided as the position of the millimeter-wave radar with respect to the tire does not change. Additionally, a millimeter-wave radar placed inside the tire may have very low exposure to environmental conditions, such as chemical aggression (e.g., dust, water, etc.).

Figure 3:
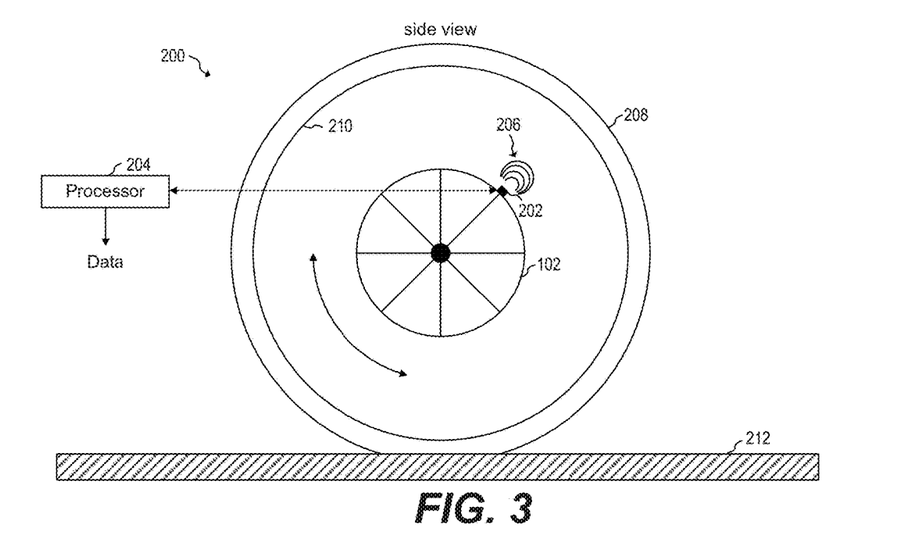
FIG. 3 shows a side view of the millimeter-wave radar system of FIG. 2, according to an embodiment of the present invention.

FIG. 3 shows a side view of millimeter-wave radar system 200, according to an embodiment of the present invention. As shown in FIG. 3, as tire 208 rotates, millimeter-wave radar 202 rotates along with tire 208. As a result, the portion of tire 208 that is illuminated by radiation pulses 206 is always the same. Reflected signals, therefore, may vary periodically based on the location of the illuminated portion of tire 208 with respect to road 212. For example, the distance between millimeter-wave radar 202 and the outer surface of tire 208 may be shorter when the illuminated portion of tire 208 is in contact with road 212 than when it is not. Processor 204 may use this and other signatures to determine, for example, the rotational speed (e.g., RPM) of tire 208 and/or speed of the vehicle.

In some embodiments, millimeter-wave radar 202 and processor 204 may determine the rotational position of millimeter wave radar 202 based on the particular signature of the reflected signals. For example, tire 208 is deformed when in contact with road 212 and less deformed, not deformed, or deformed in a different way when not in contact with road 212. Processor 204, therefore, may analyze the reflected signal and determine the rotation position of millimeter-wave radar 202 based on the signature of the reflected signal. The rotational speed of tire 208 and of the vehicle may also be determined.

Some embodiments may determine the rotational speed based on, for example, the Doppler signature of the reflected signal. The rotational speed may be used, for example, together with the rotational position of millimeter-wave radar 202 to estimate a time to turn on millimeter-wave radar 202 such that, for example, radiation pulses are transmitted in a direction towards road 212. Estimation of the time to turn on millimeter-wave radar 202 may also be based on the output of another sensor, such as a gyro sensor, for example.

The determination of signatures by a machine-learning algorithm may include information from more than one tire. For example, if the classifier determines that the front left wheel is under-inflated, processor 204 may generate and transmit a signal to the main central processing unit (CPU) of the car to alert the user of the condition. In some embodiments, the main CPU of the vehicle includes processor 204.

Advantages of some embodiments include real-time monitoring of a plurality of system-level properties related to the tire health, such as wheel alignment, fuel efficiency (as related to the health of the tires), etc.

Figure 4:
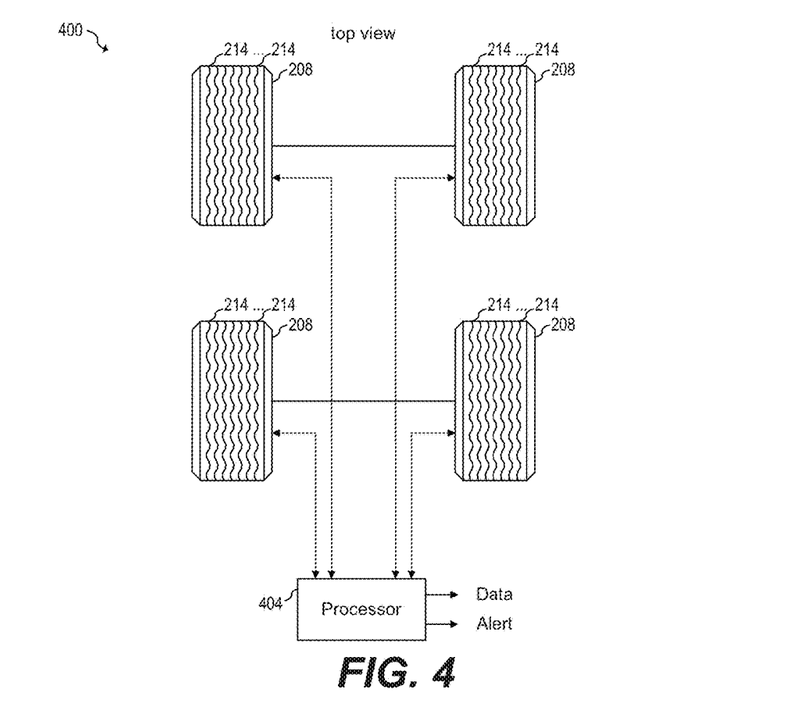
FIG. 4 shows a top view of a millimeter-wave radar system that includes a plurality of millimeter-wave radars of FIG. 2, according to an embodiment of the present invention.

In vehicles having more than one wheel, a processor may be used for each wheel. In some embodiments a single processor may be shared among two or more, including all, wheels of the vehicle. FIG. 4 shows millimeter-wave radar system 400, according to an embodiment of the present invention. Millimeter-wave radar system 400 includes four tires 208, where each tire 208 includes respective millimeter-wave radars 202 (not shown). Some embodiments may include less than four wheels, such as a motorcycle. Other embodiments may include more than four wheels, such as an eighteen-wheeler.

As shown in FIG. 4, processor 404 is shared among all millimeter-wave radars 202. In some embodiments, processor 404 may analyze data received from each millimeter-wave radar 202 independently and issue a warning to alert the user when a property is outside an expected range, or simply report a property value or property change of its respective tire 208. In other embodiments, processor 404 may analyze data from more than one millimeter-wave radar 202. By analyzing data from more than one millimeter-wave radar 202, it may be possible to determine issues with wheel balancing, alignment, or weight distribution for example. For example, if one of tires 208 experiences a larger reduction in the depth of tread 214 than another one, processor 404 may generate data or an alert signal to alert a user than an action may be needed.

Each of millimeter-wave radar 202 may communicate with processor 404 via wireless communication, such as by using WiFi, Bluetooth, or a communication protocol similar to or equal to communication protocols used in Tire Pressure Monitoring Systems (TPMS). Alternatively, a wire-based communication may be used. For example, in some embodiments, a wire may run through the hub of the wheel.

Figure 5:
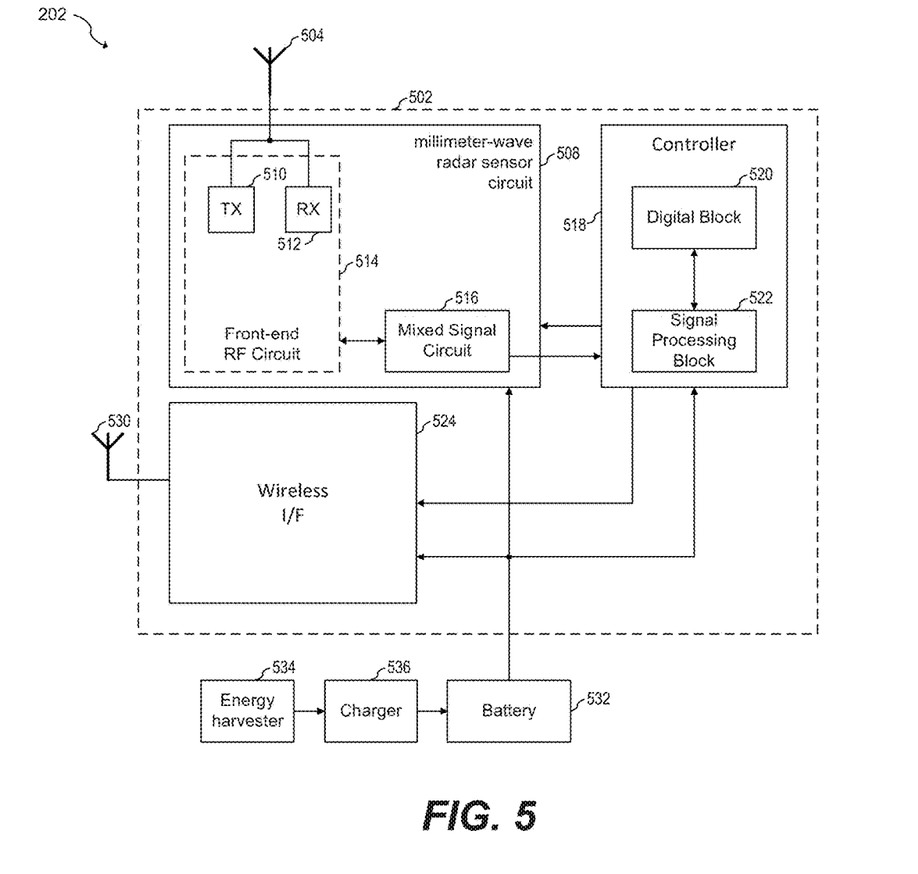
FIG. 5 shows a schematic diagram of the millimeter-wave radar of FIG. 2, according to an embodiment of the present invention.

FIG. 5 shows a schematic diagram of millimeter-wave radar 202, according to an embodiment of the present invention. As shown, millimeter-wave radar 202 is includes millimeter-wave radar sensor circuit 508 implemented in monostatic configuration, antenna 504, controller 518, and wireless interface circuit 524. Millimeter-wave radar sensor circuit 508 includes front-end RF circuit 514, and mixed signal circuit 516. Controller 518 includes digital block 520 and signal processing block 522.

RF circuit 514 is configured to transmit signals (e.g., chirps) towards inner surface 210 of tire 208 and to receive the echo (i.e., reflection) signal from objects in its field of view. RF circuit 514 includes transmitter circuit 510, receiver circuit 512. RF circuit 514 is implemented in a monostatic configuration.

Transmitter circuit 510 and receiver circuit 512 may be implemented in any way known in the art. As shown in FIG. 5, in a monostatic configuration, transmitter circuit 510 and receiver circuit 512 are connected to the same antenna 504. Some embodiments may be implemented in a bistatic configuration, in which transmitter circuit 510 is connected to a first antenna and receiver circuit 512 is connected to a second antenna.

Mixed signal circuit 516 is configured to control RF circuit 514 to transmit signals (e.g., chirps), and to receive the echo signal. Mixed signal circuit 516 is also configured to translate the RF signals into digital signals that are then transmitted to controller 518.

Mixed signal circuit 516 may be implemented in any way known in the art. For example, in some embodiments, mixed signal circuit 516 includes one or more band-pass filters (BPFs), low-pass filters (LPFs), mixers, low-noise amplifier (LNA), intermediate frequency (IF) amplifiers, phase-locked loops (PLLs) and analog-to-digital converters (ADCs).

Controller 518 is configured to process the signals received from millimeter-wave radar sensor circuit 508 and transmit it to a central processor (not shown in FIG. 5), such as processor 204 or 304. Controller 518 may be implemented in any way known in the aft, such as a general purpose controller or processor, ASIC, or any other implementation. Controller 518 typically includes digital block 520 for general control purposes (e.g., controlling millimeter-wave radar sensor circuit 508 and interface circuit 524) and a signal processing block 522 for processing the signals received from millimeter-wave radar sensor circuit 508. Digital block 520 may include a finite state machine (FSM). Signal processing block 522 may be implemented with a digital signal processor (DSP). In some embodiments, signal processing block 522 implements a portion or all of processor 204. In other embodiments, signal processing block 522 is not implemented and, instead, the raw data received from millimeter-wave radar sensor circuit 508 is sent to the central processor for further processing. In some embodiments, millimeter-wave radar sensor circuit 508 may be implemented as a frequency modulated continuous wave (FMCW) sensor.

Interface circuit 524 is configured to wirelessly transmit data from controller 518 to the central processor using antenna 530. Wireless interface 524 may be implemented in any way known in the art. For example, wireless interface 524 may be implemented for WiFi or Bluetooth communications. Other communication protocols, including low power communication protocols and low data rate communication protocols may be used.

In some embodiments, millimeter-wave radar sensor circuit 508, controller 518, and interface circuit 524 are coupled to battery 532. In some embodiments, battery 532 may be a rechargeable battery. For example, some embodiments include energy harvester 534 and charger 536 to recharge battery 532. Energy harvester 534 may harvest energy from sources such as electromagnetic, vibration, dissipation of kinetic energy from the vehicle, etc. Energy harvester may be implemented in any way known in the art.

Charger 536 takes energy from energy harvester 534 and delivers it to battery 532 during a charging operation. Charger 536 may be implemented in any way known in the art, such as using a switching converter or a linear charger topology.

In some embodiments, battery 532 is a non-rechargeable battery, such as a Lithium-Ion battery. The use of non-rechargeable batteries may be implemented, for example, in embodiments where the tire health monitoring is performed at a very low duty cycle, such as once every 30 minutes when the vehicle is on, once per hour when the vehicle is moving, once a day, or slower. Other polling intervals are also possible. Having a very low duty cycle may result in power consumption as low as a few uW.

In some embodiments, millimeter-wave radar sensor circuit 508, controller 518, and interface circuit 524 are implemented inside a same package 502. Some embodiments include antenna 504 and/or antenna 530 inside package 502. Embodiments implementing energy harvester 534 and charger 536 may implement energy harvester 534 and/or charger 536 inside package 502. Other embodiments may implement harvester 534 and charger 536 discretely or in the same printed circuit board (PCB) as millimeter-wave radar 202.

Some embodiments implement each of millimeter-wave radar sensor circuit 508, controller 518, and interface circuit 524, and antennas 504 and 53o discretely in the same PCB. Other embodiments implement millimeter-wave radar 202 using more than one PCB. Other implementations are also possible.

In some embodiments, millimeter-wave radar 202 may be coupled to the TPMS. For example, in some embodiments, millimeter-wave radar 202 is implemented in the same package as the TPMS or in the same PCB as the TPMS.

Some embodiments may share the same battery, wireless communication interface and/or portions of the controller with the TPMS. For example, a clock of the TPMS may be used to clock millimeter-wave radar 202 when millimeter—wave radar 202 is in deep sleep (e.g., when not actively monitoring the health of the tire and when most of the internal circuits of millimeter—wave radar 202 are off).

Figure 6:
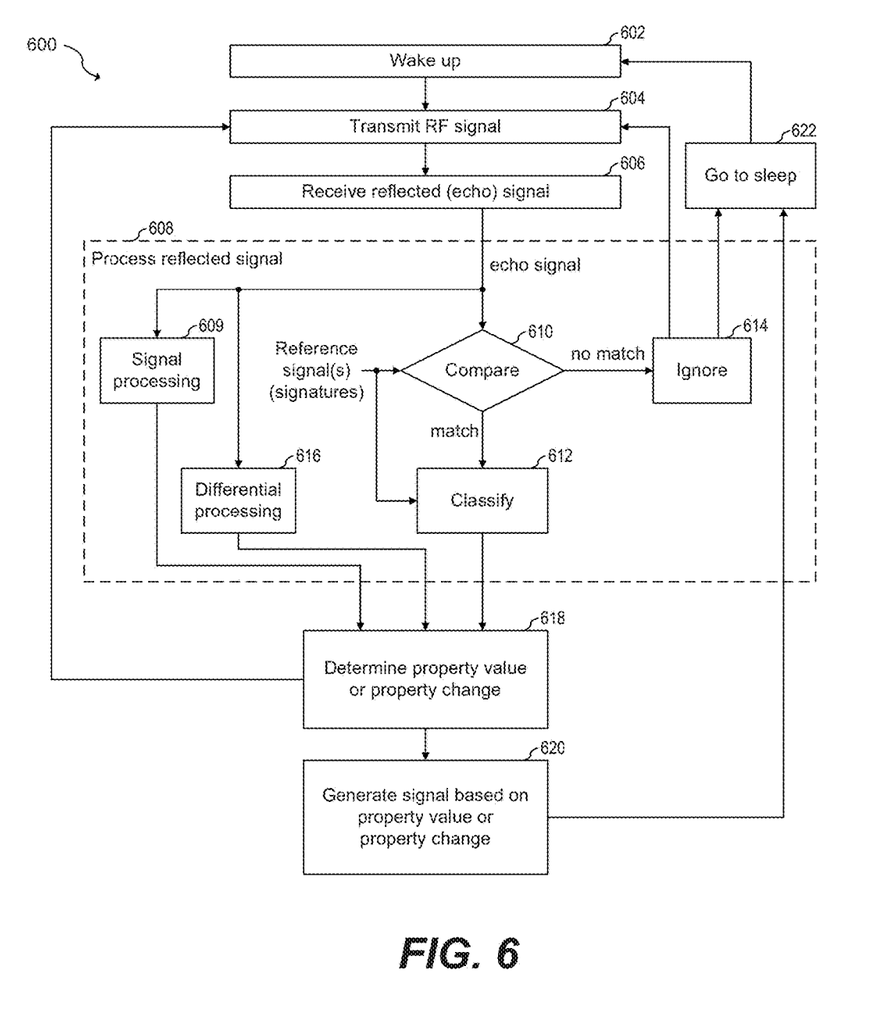
FIG. 6 illustrates a flow chart of an embodiment method for monitoring the health of a tire, according to an embodiment of the present invention.

FIG. 6 illustrates a flow chart of embodiment method 600 for monitoring the health of a tire, according to an embodiment of the present invention. Method 600 may be implemented, for example, with millimeter-wave radar systems 200 and 400. Method 600 may also be implemented in other millimeter-wave radar systems. The discussion that follows assumes that millimeter-wave radar system 200 implements method 600 for monitoring the health of a tire.

During step 602, a millimeter-wave radar installed inside a tire of a vehicle, such as millimeter-wave radar 202, wakes up from low power mode (also known as sleep mode). In some embodiments, the millimeter-wave radar wakes up when the vehicle is started, or periodically when the vehicle is on or moving, or when awaken by an external circuit, such as a TPMS. In some mode of operation, the millimeter-wave radar may remain on, thereby skipping step 602.

In some embodiments, the millimeter-wave radar is fastened to the wheel so as to rotate along with the wheel. For example, in some embodiments the millimeter-wave radar is attached to the rim by using a screw and a nut.

In other embodiments, the millimeter-wave radar is fastened to the wheel so as to not rotate along with the wheel. For example, in some embodiments the millimeter-wave radar is located in a chamber connected to the rest of the wheel via a bearing that does not rotate along with the wheel. The chamber may be, for example, in the hub of the wheel.

During step 604, the millimeter-wave radar transmits from within the wheel, e.g. from within the tire depending on its position, an RF signal, such as a plurality of chirps, towards an inner surface of the tire. In some embodiments the millimeter-wave radar may be arranged to transmit the RF signal through a window arranged in the rim, for instance in embodiments in which the millimeter-wave radar is located in the hub of the wheel or between the hub and the rim.

During step 606, the millimeter-wave radar receives the signal reflected from objects in the field of view of the millimeter-wave radar. The objects in the field of view may include, a portion of the tire, which includes a portion of the inner surface of the tire and a portion of the outer surface of the tire, the road, a portion of the chassis of the vehicle, an object attached to the tire (e.g., a nail), a portion of a fender of the vehicle, etc.

During step 608, the reflected signal is processed. The processing may include one or more of radar signal processing (step 609), such as Doppler processing, range FFT, and others; differential processing (step 616); and comparing the reflected signal with one or more references signals (step 610), and classifying the signal based on the comparison (step 612). Other processing techniques are also possible.

During step 609, quantitative values of one or more properties may be determined by using techniques such as Doppler processing. For example, a property of the tire, such as the thickness of the tire, may be determined by transmitting a plurality of chirps towards the inner surface of the tire, and analyzing the reflected signal, e.g., the frequency response and phase changes exhibited by the reflected signal when compared with the transmitted chirps. Other signal processing techniques may be used during step 609.

During step 616, a quantitative value of one or more properties may be obtained by comparing reflected signals measured at different times and/or associated with different portions of the tire or different conditions. For example, by determining a first distance from the millimeter-wave radar to the inner surface of the tire when the tire is in contact with the road, and a second distance from the millimeter-wave radar to the inner surface of the tire when the tire is not in contact with the road, it is possible to obtain a quantitative value of one or more properties, or combination of properties of the tire and/or vehicle, such as air pressure, thickness of the tire, and weight distribution of the vehicle, among others, by subtracting the first and second distances. Other differential processing techniques may also be used.

During step 610, the reflected signal is compared with reference signal(s) or signature(s). In some embodiments the signature(s) are stored locally in non-volatile memory of the millimeter-wave radar. The signature(s) may include one or more quantitative values, such as related to phase, average power, Doppler effect (including micro-Doppler and macro-Doppler), frequency spectrum, slow-time and fast-time analysis, range transformations (including range FFT), etc.

If the reflected signal matches one or more of the stored signatures during step 610, the signal is associated (classified) with an event or value during steps 612 and 618. For example, if a match is detected, a particular quantitative value (or combination of values) of the reflected signal (e.g., phase) may be associated with a particular property (e.g., depth of a tread of the tire) by a classifier module during step 612. During step 618, one or more of the quantitative values of the tire property are determined based on the output of the classifier module. A signal based on the property value or property change detected is generated during step 620. In some embodiments, such a signal is sent/reported to the main CPU or the driver of the vehicle to provide an alert of a condition (e.g., flat tire) or to report the value of a property (e.g., thickness of the tire).

If no match is detected during step 610, the millimeter-wave radar takes no action based on the comparison (step 614) and goes into low power mode (step 622). In some embodiments, the millimeter-wave radar may immediately transmit a new RF signal (step 604), without going into low power mode.

Some embodiments may perform steps 609, 616, 610 and 612. Other embodiments may perform step 609 without performing steps 616, 610 and 612. Other embodiments may perform steps 609 and 616 without performing steps 610 and 612. Yet other embodiments may perform steps 610 and 612 without performing steps 609 and 616. Yet other embodiments may perform step 616 without performing steps 610 and 612. Other embodiments may perform steps 609, 610 and 612 without performing step 616. Other combination and other processing techniques are also possible.

Example embodiments of the present invention are summarized here. Other embodiments can also be understood from the entirety of the specification and the claims filed herein.

Example 1

A system including: a millimeter-wave radar sensor circuit configured to be fastened to a wheel having a tire, the millimeter-wave radar sensor circuit configured to: transmit a radio-frequency (RF) signal towards a portion of an inner surface of the tire, and receive a reflected signal from the tire; and a controller configured to: process the reflected signal, determine a property value of the tire based on processing the reflected signal, and generate and transmit a first signal representative of the property value of the tire.

Example 2

The system of example 1, where the controller is further configured to generate an alert signal when the first signal is outside an expected range.

Example 3

The system of one of examples 1 or 2, where the millimeter-wave radar sensor circuit is configured to be fastened to the wheel between the rim and the tire.

Example 4

The system of one of examples 1 to 3, where the millimeter-wave radar sensor circuit is configured to be fastened to the wheel so as to avoid rotating with the wheel.

Example 5

The system of one of examples 1 to 4, where the property value includes a tread depth value.

Example 6

The system of one of examples 1 to 5, where the controller is further configured to determine a rotational speed of the tire based on processing the reflected signal.

Example 7

The system of one of examples 1 to 6, where the property value includes a tire thickness value.

Example 8

The system of one of examples 1 to 7, where the millimeter-wave radar sensor circuit is configured to transmit the RF signal while rotating with the tire.

Example 9

The system of one of examples 1 to 8, further including a tire-pressure monitoring system (TPMS) attached to a rim of the wheel, where the TPMS includes the millimeter-wave radar sensor circuit.

Example 10

The system of one of examples 1 to 9, where the controller is further configured to determine a distance between the millimeter-wave radar sensor circuit and a road surface based on processing the reflected signal.

Example 11

The system of one of examples 1 to 10, where the controller is configured to process the reflected signal by determining a difference between the reflected signal and a predetermined expected reflected signal.

Example 12

The system of one of examples 1 to 11, where the controller is configured to process the reflected signal by: determining a phase of the reflected signal; and determining a phase magnitude difference between the phase of the reflected signal and a phase reference, and where the controller is configured to determine the property value based on the determined phase magnitude difference.

Example 13

The system of one of examples 1 to 12, where the controller is configured to process the reflected signal by:

determining an average power of the reflected signal; and determining an average power magnitude difference between the average power of the reflected signal and an average power reference, and where the controller is configured to determine the property value based on the determined average power magnitude difference.

Example 14

The system of one of examples 1 to 13, further including a second millimeter-wave radar sensor circuit configured to be fastened to the wheel, the second millimeter-wave radar sensor circuit configured to: transmit an RF signal towards a second portion of the inner surface of the tire, and receive a reflected signal from the tire.

Example 15

The system of one of examples 1 to 14, where the portion of the inner surface of the tire partially overlaps with the second portion of the inner surface of the tire.

Example 16

A method for tire monitoring, the method including: transmitting a radio-frequency (RF) signal from an inside of a wheel and towards an inner surface of a tire disposed on a rim of the wheel using a millimeter-wave radar sensor circuit; receiving a reflected signal from the tire; processing the reflected signal; determining a property value of the tire based on processing the reflected signal; and generating a signal representative of the property value of the tire.

Example 17

The method of example 16, further including transmitting a plurality of RF signals using the millimeter-wave radar sensor circuit when the wheel is rotating, where each RF signal of the plurality of RF signals is transmitted towards a same first portion of the inner surface of the tire.

Example 18

The method of one of examples 16 or 17, further including transmitting a second RF signal with a second millimeter-wave radar sensor circuit from an inside of the wheel and towards a second portion of the inner surface of the tire, the second portion being different than the first portion.

Example 19

The method of one of examples 16 to 18, further including alerting a user when the property value is outside an expected range.

Example 20

The method of one of examples 16 to 19, where the property value includes a tread depth value, a tire thickness value or a tire air pressure.

Example 21

The method of one of examples 16 to 20, further including transmitting an RF signal from an inside of a second wheel and towards an inner surface of a second tire disposed on a second rim of the second wheel using a second millimeter-wave radar sensor circuit; receiving a second reflected signal from the second tire; processing the second reflected signal; determining a property value of the second tire based on processing the second reflected signal; and determining a property of a wheel system of a vehicle including the wheel and the second wheel based on the property value of the tire and the second tire.

Example 22

A millimeter-wave radar configured to be fastened to a wheel having a tire, the millimeter-wave radar including: a millimeter-wave radar sensor circuit including a front-end radio-frequency (RF) circuit configured to be coupled to a first antenna, the millimeter-wave radar sensor circuit configured to transmit via the first antenna an RF signal towards an inner surface of the tire and receive a reflected signal from the tire; a controller coupled to the millimeter-wave radar sensor circuit; and a wireless interface coupled to the controller and configured to be coupled to a second antenna, the wireless interface configured to transmit data associated with the reflect signal via the second antenna to a processor, where the controller or the processor is configured to: process the reflected signal, determine a property value of the tire based on processing the reflected signal, and generate and transmit a first signal representative of the property value of the tire.

Example 23

The millimeter-wave radar of example 22, where the millimeter-wave radar sensor circuit is configure to receive the reflect signal using the first antenna.

Example 24

The millimeter-wave radar of one of examples 22 or 23, further including a rechargeable battery.

Example 25

The millimeter-wave radar of one of examples 22 to 24, further including an energy harvester and a charger, where the charger is configured to charge the rechargeable battery during a charging operation.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A system comprising:
a millimeter-wave radar sensor circuit configured to be fastened to a wheel having a tire, the millimeter-wave radar sensor circuit configured to:
transmit a radio-frequency (RF) signal towards a portion of an inner surface of the tire, and
receive a reflected signal from the tire; and
a controller configured to:
process the reflected signal by determining a difference between the reflected signal and a predetermined expected reflected signal,
determine a property value of the tire based on processing the reflected signal, and
generate and transmit a first signal representative of the property value of the tire.

2. The system of claim 1, wherein the controller is further configured to generate an alert signal when the first signal is outside an expected range.

3. The system of claim 1, wherein the millimeter-wave radar sensor circuit is configured to be fastened to the wheel between the rim and the tire.

4. A system comprising:
a millimeter-wave radar sensor circuit configured to be fastened to a wheel having a tire, the millimeter-wave radar sensor circuit configured to:
transmit a radio-frequency (RF) signal towards a portion of an inner surface of the tire, and
receive a reflected signal from the tire; and
a controller configured to:
process the reflected signal,
determine a property value of the tire based on processing the reflected signal, and
generate and transmit a first signal representative of the property value of the tire, wherein the millimeter-wave radar sensor circuit is configured to be fastened to the wheel so as to avoid rotating with the wheel.

5. The system of claim 1, wherein the property value comprises a tread depth value.

6. A system comprising:
a millimeter-wave radar sensor circuit configured to be fastened to a wheel having a tire, the millimeter-wave radar sensor circuit configured to:
transmit a radio-frequency (RF) signal towards a portion of an inner surface of the tire, and
receive a reflected signal from the tire; and
a controller configured to:
process the reflected signal,
determine a property value of the tire based on processing the reflected signal,
generate and transmit a first signal representative of the property value of the tire, and determine a rotational speed of the tire based on processing the reflected signal.

7. The system of claim 1, wherein the property value comprises a tire thickness value.

8. The system of claim 1, wherein the millimeter-wave radar sensor circuit is configured to transmit the RF signal while rotating with the tire.

9. The system of claim 8, further comprising a tire-pressure monitoring system (TPMS) attached to a rim of the wheel, wherein the TPMS comprises the millimeter-wave radar sensor circuit.

10. A system comprising:
a millimeter-wave radar sensor circuit configured to be fastened to a wheel having a tire, the millimeter-wave radar sensor circuit configured to:
transmit a radio-frequency (RF) signal towards a portion of an inner surface of the tire, and
receive a reflected signal from the tire; and
a controller configured to:
process the reflected signal,
determine a property value of the tire based on processing the reflected signal,
generate and transmit a first signal representative of the property value of the tire, and determine a distance between the millimeter-wave radar sensor circuit and a road surface based on processing the reflected signal.

11. The system of claim 1, wherein the controller is configured to process the reflected signal by:
determining a phase of the reflected signal; and
determining a phase magnitude difference between the phase of the reflected signal and a phase reference, and wherein the controller is configured to determine the property value based on the determined phase magnitude difference.

12. The system of claim 1, wherein the controller is configured to process the reflected signal by:
determining an average power of the reflected signal; and
determining an average power magnitude difference between the average power of the reflected signal and an average power reference, and wherein the controller is configured to determine the property value based on the determined average power magnitude difference.

13. A system comprising:
a millimeter-wave radar sensor circuit configured to be fastened to a wheel having a tire, the millimeter-wave radar sensor circuit configured to:
transmit a radio-frequency (RF) signal towards a first portion of an inner surface of the tire, and
receive a reflected signal from the tire;
a controller configured to:
process the reflected signal,
determine a property value of the tire based on processing the reflected signal, and
generate and transmit a first signal representative of the property value of the tire; and
a second millimeter-wave radar sensor circuit configured to be fastened to the wheel, the second millimeter-wave radar sensor circuit configured to:
transmit an RF signal towards a second portion of the inner surface of the tire, and
receive a reflected signal from the tire, wherein the first portion of the inner surface of the tire partially overlaps with the second portion of the inner surface of the tire.

14. A method for tire monitoring, the method comprising:
transmitting a radio-frequency (RF) signal from an inside of a wheel and towards an inner surface of a tire disposed on a rim of the wheel using a millimeter-wave radar sensor circuit;
receiving a reflected signal from the tire;
processing the reflected signal by determining a difference between the reflected signal and a predetermined expected reflected signal;
determining a property value of the tire based on processing the reflected signal; and
generating a signal representative of the property value of the tire.

15. The method of claim 14, further comprising transmitting a plurality of RF signals using the millimeter-wave radar sensor circuit when the wheel is rotating, wherein each RF signal of the plurality of RF signals is transmitted towards a same first portion of the inner surface of the tire.

16. The method of claim 15, further comprising transmitting a second RF signal with a second millimeter-wave radar sensor circuit from an inside of the wheel and towards a second portion of the inner surface of the tire, the second portion being different than the first portion.

17. The method of claim 14, further comprising alerting a user when the property value is outside an expected range.

18. The method of claim 14, wherein the property value comprises a tread depth value, a tire thickness value or a tire air pressure.

19. The method of claim 14, further comprising transmitting an RF signal from an inside of a second wheel and towards an inner surface of a second tire disposed on a second rim of the second wheel using a second millimeter-wave radar sensor circuit;

receiving a second reflected signal from the second tire;
processing the second reflected signal;
determining a property value of the second tire based on processing the second reflected signal; and
determining a property of a wheel system of a vehicle comprising the wheel and the second wheel based on the property value of the tire and the second tire.

20. A millimeter-wave radar configured to be fastened to a wheel having a tire, the millimeter-wave radar comprising:
a millimeter-wave radar sensor circuit comprising a front-end radio-frequency (RF) circuit configured to be coupled to a first antenna, the millimeter-wave radar sensor circuit configured to transmit via the first antenna an RF signal towards an inner surface of the tire and receive a reflected signal from the tire;
a controller coupled to the millimeter-wave radar sensor circuit; and
a wireless interface coupled to the controller and configured to be coupled to a second antenna, the wireless interface configured to transmit data associated with the reflect signal via the second antenna to a processor, wherein the controller or the processor is configured to:
process the reflected signal by determining a difference between the reflected signal and a predetermined expected reflected signal,
determine a property value of the tire based on processing the reflected signal, and
generate and transmit a first signal representative of the property value of the tire.

21. The millimeter-wave radar of claim 20, wherein the millimeter-wave radar sensor circuit is configured to receive the reflect signal using the first antenna.

22. The millimeter-wave radar of claim 20, further comprising a rechargeable battery.

23. The millimeter-wave radar of claim 22, further comprising an energy harvester and a charger, wherein the charger is configured to charge the rechargeable battery during a charging operation.

24. The millimeter-wave radar of claim 20, wherein the millimeter-wave radar sensor circuit is configured to be fastened to the wheel so as to avoid rotating with the wheel.

25. The method of claim 14, wherein processing the reflected signal comprises:
determining an average power of the reflected signal; and
determining an average power magnitude difference between the average power of the reflected signal and an average power reference.

* * * * *